United States Patent
Toliyat et al.

(10) Patent No.: US 6,426,605 B1
(45) Date of Patent: Jul. 30, 2002

(54) MULTI-PHASE INDUCTION MOTOR DRIVE SYSTEM AND METHOD

(75) Inventors: Hamid A. Toliyat; Ruhe Shi, both of College Station; Huangsheng Xu, Bryan, all of TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/617,393

(22) Filed: Jul. 17, 2000

Related U.S. Application Data
(60) Provisional application No. 60/144,102, filed on Jul. 16, 1999.

(51) Int. Cl.$^7$ ................................................. H02P 5/41
(52) U.S. Cl. ......................... 318/801; 318/807; 318/448
(58) Field of Search .............................. 318/798, 799, 318/800, 801, 807, 611, 448, 702

(56) References Cited

U.S. PATENT DOCUMENTS

| | | | | |
|---|---|---|---|---|
| 4,306,182 A | * | 12/1981 | Curtiss | 318/811 |
| 4,445,080 A | * | 4/1984 | Curtiss | 318/798 |
| 4,808,903 A | * | 2/1989 | Matsui et al. | 318/800 |
| 5,668,457 A | * | 9/1997 | Motamed | 318/606 |

OTHER PUBLICATIONS

H. A. Toliyat, et al.; "Analysis of a Concentrated Winding Induction Machine for Adjustable Speed Drive Applications—Part I (Motor Analysis);" IEEE–PES Winter Meeting, Dec., 1991 all.

H. A. Toliyat, et al.; "Analysis of a Concentrated Winding Induction Machine for Adjustable Speed Drive Applications—Part II (Motor Design and Performance);" IEEE Transaction on Energy Conversion, vol. 6, No. 4, pp. 685–692, Dec. 1991.

H. A. Toliyat, et al.; "Analysis of Concentrated Winding Induciton Machines for Adjustable Speed Drive Applications—Experimental Results;" IEEE Transactions on Energy Conversion, vol. 9, No. 4, pp. 694–700, Dec. 1994.

G. W. McLean, et al.; "Performance and design of induction motors with square wave excitation;" Proc. Inst. Elec. Eng.; vol. 116; pp. 1405–1411, Jun. 1969.

K. N. Pavithran, et al; "A novel polyphase reference sin wave generator using multiplexing technique;" IEEE Trans. Ind. Electron.; vol. IE–33, No. 3; pp. 342–344, Aug. 1986.

E.E. Ward, et al.; "Preliminary investigation of an inventor–fed 5–phase induciton motor;" Proc. Inst. Elec. Eng.; vol. 116; pp. 980–984, Jun. 1969.

K. N. Pavithran, et al.; "Studies on Inverter–Fed Five–phase Induction Motor Drive;" IEEE Transactions on Power Electronics, vol. 3, No. 2; pp. 224–235, Apr. 1988.

(List continued on next page.)

Primary Examiner—Bentsu Ro
(74) Attorney, Agent, or Firm—Baker Botts L.L.P.

(57) ABSTRACT

A multiphase induction motor system is disclosed. The system comprises a motor having at least five phases and comprising a stator and a rotor. For each phase, the motor receives a command current to power the motor, where the command current has a fundamental frequency. A processor determines, for each phase, at least one harmonic component of a signal indicative of the fundamental frequency, generates a command current from the harmonic component and the fundamental frequency, and supplies the command current to the stator. A method for operating a multiphase induction motor system is disclosed. A first command current is supplied to a motor having at least five phases, where the first command current powers the motor. The first command current has a fundamental frequency, and the motor comprises a stator and a rotor. For each phase, at least one harmonic component of a signal indicative of the fundamental frequency is determined. A second command current is generated from the harmonic component and the fundamental frequency. The second command current is supplied to the stator.

9 Claims, 3 Drawing Sheets

OTHER PUBLICATIONS

J. McGuinness; "Advantages of Five Phase Motors in Microstepping Drive;" Stepper Motors and Their Control, IEE Colloquium; pp. 1/1–1/6, 1994.

A. V. Brazhnikov, et al.; "Control potentials and Advantages of Multiphase AC Drives;" Power Electronics Specialists Conference; PESC 98 Record. 29th Annual IEEE, vol. 2; pp. 2108–2114, Aug. 1998.

H. A. Toliyat, et al.; "dq Modeling of Five Phase Synchronous Reluctance Machines Including Third Harmonic of Air–Gap MMF;" Proceedings of the IEEE–IAS Annual Meeting Conference; pp. 231–237, Nov. 1991.

H. A. Toliyat, et al.; "Analysis and Modeling of Five Phase Converters For Adjustable Speed Drive Applications;" Proceedings of the 5th European Conference on Power Electronics and Applications (EPE'93); pp. 194–199, Sep. 13–16, 1993.

H. A. Toliyat; "Analysis and Simulation of Multi–Phase Variable Speed Induction Motor Drives Under Asymmetrical Connections;" IEEE Trans. on Poer Electronics, vol. 13, No. 4; pp. 748–756, Jul. 1998.

Hamid A. Toliyat, et al.; "A Five–Phase Reluctance Motor with High Specific Torque;" IEEE Transaction on Industry Applications; vol. 28, No. 3; pp. 659–667, May/Jun. 1992.

C.C. Chan, et al.; "A Novel Polyphase Multipole Square–Wave Permanent Magnet Motor Drive for Electric Vehicles;" IEEE Transactions, vol. 30, No. 5; pp. 1258–1266, Sep.–Oct. 1994.

Yuriy Kats; "Adjustable–Speed Drives With Multiphase Motors;" Electric Machines and Drives Conference Record; IEEE International; pp. TC2/4.1–TC2/4.3, 1997.

Hamid A. Toliyat; "Analysis and Simulation of Five–Phase Variable–Speed Induction Motor Drives Under Asymmetrical Connections;" IEEE Transactions on Power Electronics, vol. 13, No. 4; pp. 748–756, Jul. 1998.

Hamid A. Toliyat, et al; "Parameter Estimation Algorithm using Spectral Analysis for Vector Controlled Induction Motor Drives;" IEEE International Symposium on Industrial Electronics; pp. 90–95, 1993.

H. Toliyat, et al.; Rotor Time Constant Updating Scheme for a Rotor Flux Oriented Induction Motor Drive; IEEE Power Electronics Specialists Conference; 1995; 26th; vol. 2; pp. 1302–1306.

Hamid A. Toliyat, et al.; "A Novel Direct Torque Control 9DTC) Method for Five–Phase Induction Machines;" Proceedings of the 2000 Applied Power Electronics Conference (APEC '00); New Orleans, LA, Feb. 6–10, 2000.

* cited by examiner

US 6,426,605 B1

MULTI-PHASE INDUCTION MOTOR DRIVE SYSTEM AND METHOD

RELATED APPLICATION

This application claims benefit under 35 U.S.C. § 119 of U.S. provisional application Ser. No. 60/144,102, entitled Five Phase Induction Drive System and Method, which was filed on Jul. 16, 1999.

GOVERNMENT INTEREST

The invention was made with Government support under Contract N00014-98-1-0717 awarded by Office of Naval Research, Arlington, Va. 22217-5660. The Government may have certain rights in the invention.

TECHNICAL FIELD OF THE INVENTION

This invention relates generally to the field of motor drive systems and more specifically to a multi-phase induction motor drive system and method.

BACKGROUND OF THE INVENTION

The need for efficient motors has led to the demand for improved multi-phase induction motor drive systems and methods. Engineers are faced with the problem of designing motors that yield greater power and torque density. For example, motors powered by inverters often do not achieve high power output. Inverters impress rectangular voltage or current output on motors that are typically designed to receive sinusoidal input, thus reducing the power capabilities of the motors. Additionally, motors designed to receive sinusoidal input typically produce low torque output. Accordingly, designing motors that yield greater power and torque density has posed a challenge for engineers.

SUMMARY OF THE INVENTION

While known approaches have provided improvements over prior approaches, the challenges in the field of drive systems have continued to increase with demands for more and better techniques having greater effectiveness. Therefore, a need has arisen for a multi-phase induction motor drive system and method.

In accordance with the present invention, a multi-phase induction motor drive system and method are provided that substantially eliminate or reduce the disadvantages and problems associated with previously developed systems and methods.

According to one embodiment of the present invention, a multi-phase induction motor drive system is disclosed. The system comprises a motor having at least five phases and comprising a stator and a rotor. For each phase, the motor receives a command current to power the motor, where the command current has a fundamental frequency. A processor determines, for each phase, at least one harmonic component of a signal indicative of the fundamental frequency, generates a command current from the harmonic component and the fundamental frequency, and supplies the command current to the stator.

According to another embodiment of the present invention, a method for operating a multi-phase induction motor drive system is disclosed. A first command current is supplied to a motor having at least five phases, where the first command current powers the motor. The first command current has a fundamental frequency, and the motor comprises a stator and a rotor. For each phase, at least one harmonic component of a signal indicative of the fundamental frequency is determined. A second command current is generated from the harmonic component and the fundamental frequency. The second command current is supplied to the stator.

Embodiments of the invention may provide numerous technical advantages. For example, a technical advantage of one embodiment is that the power density of a motor may be improved by enhancing the motor's ability to utilize rectangular current input. Another technical advantage of one embodiment is that a combination of harmonic components of a fundamental frequency may be used to increase torque density. Another technical advantage of one embodiment is that a multi-phase motor may be able to operate under loss of one or more phases, increasing the reliability of the motor. Another technical advantage of one embodiment is that the flux of the multi-phase motor may be more evenly distributed than that of known motors, thus decreasing the torque pulsation and lowering acoustic noise in the motor.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 3 is a block diagram of one embodiment of an inverter of FIG. 2 according to the teachings of the present invention.

DETAILED DESCRIPTION OF THE DRAWINGS

Figure 1:
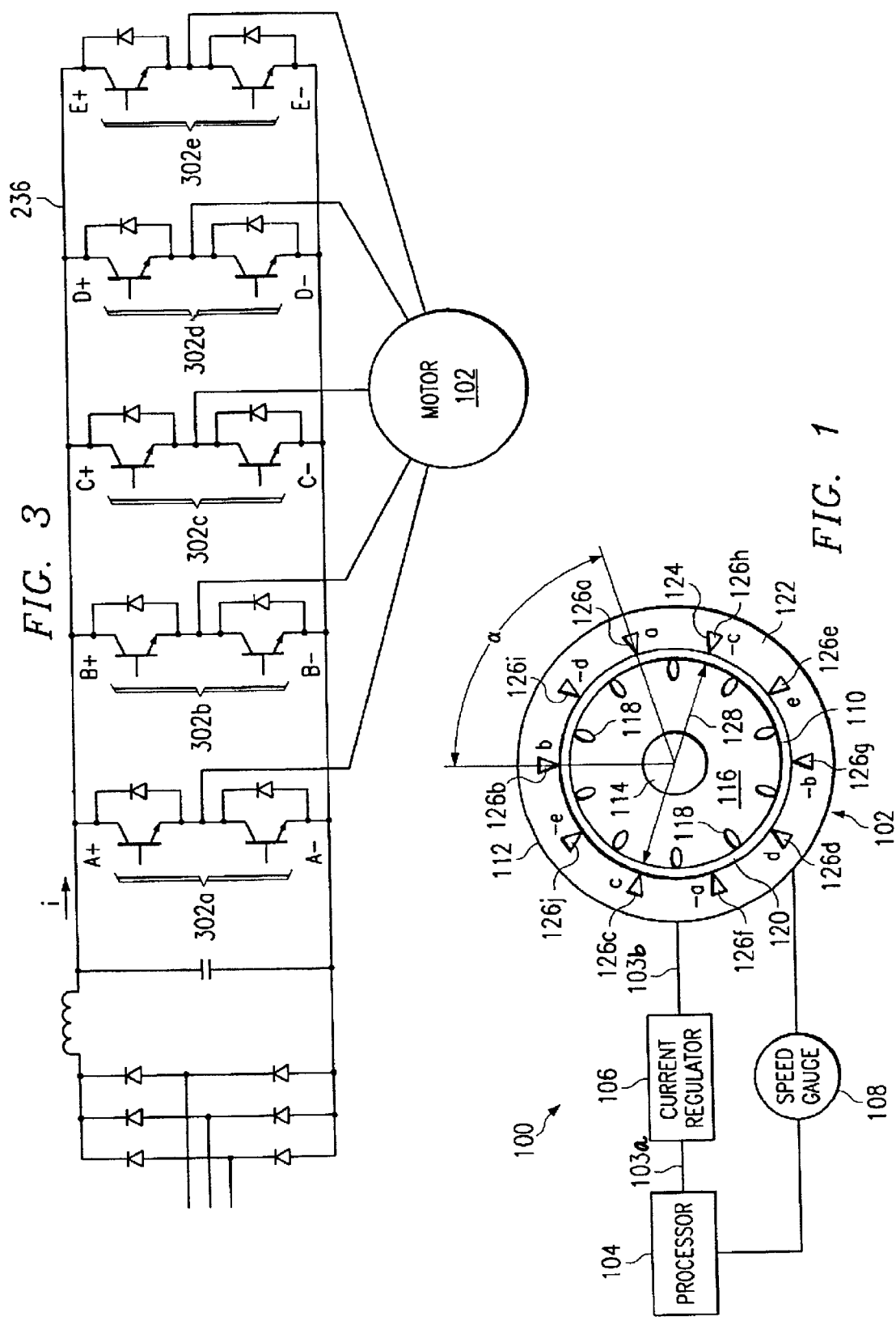
FIG. 1 is a block diagram of one embodiment of a multi-phase induction motor drive system according to the teachings of the present invention.

Embodiments of the present invention and its advantages are best understood by referring to FIGS. 1 though 4 of the drawings, like numerals being used for like and corresponding parts of the various drawings.

FIG. 1 is a block diagram of one embodiment of a multi-phase induction motor drive system 100 according to the teachings of the present invention. System 100 comprises a motor 102, a processor 104, a current regulator 106, and a speed sensor 108. As described in greater detail below, system 100 produces a substantially rectangular air gap flux density in motor 102. Such a flux density results in increased power and torque density. Processor 104, which is described in connection with FIG. 2, receives feedback from motor 102 and generates command currents 103a in response to the feedback. The feedback comprises motor speed information. Command currents 103 power motor 102 and, like prior systems, include a fundamental frequency of substantially sinusoidal shape. According to the teachings of the invention, command currents 103a are generated from the fundamental frequency and a harmonic component of the fundamental frequency in order to induce a substantially rectangular air gap flux density. Current regulator 106, which is described in connection with FIG. 2, receives feedback from motor 102 and adjusts the command currents 103a in response to the feedback. The feedback comprises motor current information. Current regulator 106 transmits the adjusted command currents 103b to motor 102. Motor 102 is designed to produce a substantially rectangular air gap flux density when supplied with command currents 103b, resulting in enhanced power and torque density.

In one embodiment, motor 102 comprises a multi-phase induction motor, for example, a five phase induction motor, and has any suitable number of poles, for example, two or four poles. Motor 102 includes a rotor 110 that rotates within a stator 112. Speed sensor 108 may be used to measure the rotation speed of rotor 110. An air gap 120 is located substantially between rotor 110 and stator 112.

Stator 112 is shaped to accommodate the rotation of rotor 110, and may be, for example, cylindrical with a diameter 128. A stator lamination 122 may comprise, for example, silicon and steel. A plurality of stator slots 124 are formed within stator lamination 122. A plurality of stator windings 126 are located substantially within stator slots 124. Stator windings 126 are used to create a magnetic field, and may comprise, for example, copper, aluminum, or other suitable conductive material. Stator windings may be concentrated, instead of sinusoidal, in order to achieve a substantially rectangular air gap flux density. Stator windings 126 are associated with a phase of a multi-phase induction motor 102. Stator windings 126 may be full pitch, that is, stator windings 126 associated with one phase may be located at opposing ends of a diameter 128 of stator 112. For example, stator winding 126a located at one end of diameter 128 and stator winding 126f located at the other end are associated with one phase. Stator windings 126 may be evenly spaced around stator 112. For example, the angle α between stator windings 126a, 126b, 126c, 126d, and 126e representing positive poles may be approximately 72°.

Rotor 110 is shaped to rotate within stator 112, and may be, for example, cylindrical with an axis about which rotor 110 rotates. Rotor 110 includes a shaft 114 located substantially at the axis of rotation. Disposed outwardly from shaft 114 is a rotor lamination 116. Rotor lamination 116 may comprise, for example, silicon and steel. Substantially embedded in rotor lamination 116 are a plurality of rotor bars 118. Rotor bars 118 may comprise, for example, copper, aluminum, or other suitable conductive material. Rotor 110 may include any suitable number of rotor bars 118, for example, at least twenty, such as twenty-eight rotor bars 118, substantially equally placed around rotor 110. In one embodiment, rotor bars 118 may be not skewed. The number of stator windings 126 and rotor bars 118 may be selected as to yield a rectangular or substantially rectangular flux distribution in air gap 120, in response to the input of proper command currents. A motor that has a rectangular air gap flux distribution may yield higher torque density and power output because the conductive material of the motor, for example, iron, is utilized more effectively. For example, a five-phase induction motor with a rectangular air gap flux distribution may generate more power and torque density than that generated by a sinusoidal three-phase induction motor, while using the same amount of material used by the three-phase motor.

Motor 102 with command currents 103b generated from a fundamental frequency and a harmonic component of the fundamental frequency may be described as a plurality of independent motors, one with command currents 103 generated from the fundamental frequency and one with command currents generated from the harmonic component. The fundamental frequency may be associated with a fundamental frequency of command currents 103b. For example, a five-phase induction motor may have command currents 103, represented by $i_a^*$, $i_b^*$, $i_c^*$, $i_d^*$, and $i_e^*$, generated from the fundamental (or first) and third harmonic components of a fundamental frequency, such that:

$$i_k^* = i_{k1}^* + i_{k3}^*, k=a, b, c, d, e$$

where the number index refers to the harmonic component, for example, the first and third harmonic components. Thus, for example, motor 102 may be described as two motors, one with command currents $i_{a1}^*$, $i_{b1}^*$, $i_{c1}^*$, $i_{d1}^*$, and $i_{e1}^*$, and one with command currents $i_{a3}^*$, $i_{b3}^*$, $i_{c3}^*$, $i_{d3}^*$, and $i_{e3}^*$.

To describe the five-phase induction motor, a $q_1$-$d_1$-$q_3$-$d_3$-n model may be used in place of the well-known q-d model. The $q_1$-$d_1$-$q_3$-$d_3$-n model includes a $q_1$-axis and a $d_1$-axis, which refer to the q-axis and d-axis, respectively, of a rotor of a motor with command currents $i_{a1}^*$, $i_{b1}^*$, $i_{c1}^*$, $i_{d1}^*$, and $i_{e1}^*$. Similarly, a $q_3$-axis and a $d_3$-axis refer to the q-axis and d-axis, respectively, of a rotor of a motor with command currents $i_{a3}^*$, $i_{b3}^*$, $i_{c3}^*$, $i_{d3}^*$, and $i_{e3}^*$.

The dynamic behavior of the five-phase induction motor may be described in the $q_1$-$d_1$-$q_3$-$d_3$-n model by flux linkage Equations (1) through (11) in an arbitrary rotating reference frame:

$$\lambda_{qs1} = L_{ls}i_{qs1} + L_{m1}(i_{qs1} + i'_{qr1}) \tag{1}$$

$$\lambda_{ds1} = L_{ls}i_{ds1} + L_{m1}(i_{ds1} + i'_{dr1}) \tag{2}$$

$$\lambda_{qs3} = L_{ls}i_{qs3} + L_{m3}(i_{qs3} + i'_{qr1}) \tag{3}$$

$$\lambda_{ds3} = L_{ls}i_{ds3} + L_{m3}(i_{ds3} + i'_{dr3}) \tag{4}$$

$$\lambda_{ns1} = L_{ls}i_{ns1} \tag{5}$$

$$\lambda'_{qr1} = L'_{lr}i'_{qr1} + L_{m1}(i_{qs1} + i'_{qr1}) \tag{6}$$

$$\lambda'_{dr1} = L'_{lr}i'_{dr1} + L_{m3}(i_{ds1} + i'_{dr1}) \tag{7}$$

$$\lambda'_{qr3} = L'_{lr}i'_{qr3} + L_{m3}(i_{ds3} + i'_{qr3}) \tag{8}$$

$$\lambda'_{dr3} = L'_{lr}i'_{dr1} + L_{m3}(i_{ds3} + i'_{dr3}) \tag{9}$$

$$\lambda'_{nr} = (L'_{lr})i'_{nr}$$

where λ is flux linkage, L is inductance, i is current, l is leakage, m is magnetizing, s is stator 112, and r is rotor 110. The primes indicate rotor variables transferred to the stator side. The electromagnetic torque is given by Equation (11):

$$T_e = \frac{5}{2}\frac{p}{2}[L_{m1}(i_{ds1}i'_{qr1} - i_{qs1}i'_{dr1}) + 3L_{m3}(i_{ds3}i'_{qr3} - i_{qs3}i'_{dr3})] \tag{11}$$

$$T_e - T_L = J_m \frac{d\omega_r}{dt} \tag{12}$$

where:

$$L_{m1} = \frac{5}{2}L_{ms1}$$

$$L_{m3} = \frac{5}{2}L_{ms3} \text{ and}$$

$$p = \frac{d}{dt}$$

and $J_m$ is the mechanical motion inertia.

In operation, processor 104 generates command currents 103a for motor 102 in response to speed feedback from motor 102. Current regulator 106 adjusts command currents 103a in response to current feedback from motor 102 and sends adjusted command currents 103b to motor 102. Command currents 103b are passed through stator windings 126 to create magnetic fields in stator 112. The lines of force of each magnetic field revolve around stator windings 126, which induces a current in rotor bars 118. In response, rotor 110 generates a magnetic field attracted to the magnetic field of stator 112. As the magnetic field of stator 112 revolves around stator windings 126, rotor 110 rotates. In order to maintain rotation of rotor 110, the magnetic field of the rotor 110 lags behind the magnetic field of stator 112. The slip speed is the difference between speeds of rotations.

System 100 includes a five or more phase motor 102, which may have substantially concentrated stator windings 126, and processor 104 that generates command currents 103a from a harmonic component of a fundamental frequency. As a result, system 100 produces a substantially rectangular air gap flux density in motor 102. Such flux density results in higher power and torque density than that of an equivalent sinusoidaly wound three-phase motor using the same amount of material. Additional details of processor 104, current regulator 106, and inverter 236 are described in FIGS. 2 and 3. A method for operating system 100 is described in FIG. 4.

Figure 2:
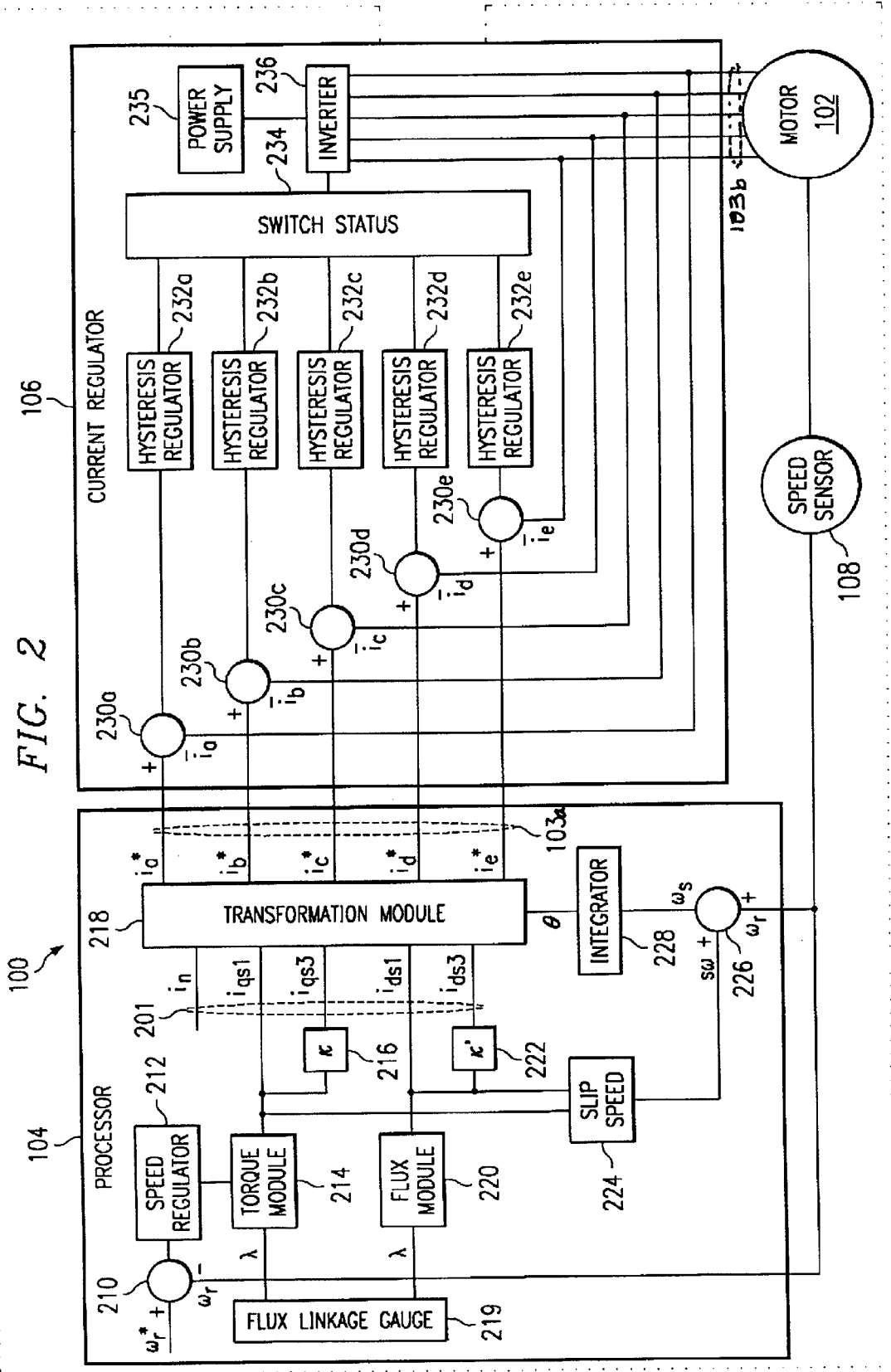
FIG. 2 is a block diagram of one embodiment of a processor and a current regulator of FIG. 1 according to the teachings of the present invention.

FIG. 2 is a block diagram of one embodiment of processor 104 and current regulator 106 of FIG. 1 according to the teachings of the present invention. Processor 104 generates command currents 103a that may achieve a substantially rectangular air gap flux distribution in motor 102. In this example, the fundamental and third harmonic components 201 are associated with a fundamental frequency of a command current 103b are used to generate command currents 103a for the motor. Any suitable harmonic components, however, may be used. For example, the (n−2) harmonic components may be used to generate command currents for an n-phase motor, where n=5, 7, 9 . . . . For convenience, currents having the harmonic components 201 are represented by $i_{qs1}^*$, $i_{qs3}^*$, $i_{ds1}^*$, $i_{ds3}^*$ and $i_n$. The fundamental frequency may be determined from a signal from speed sensor 108 indicating the fundamental frequency of a command current 103b.

An adder 210 receives a measured rotor speed $\omega_r$ from speed sensor 108 and a rotor speed command $\omega_r^*$ input into processor. For convenience, commands are designated with an asterisk to distinguish the commands from measurements. Adder 210 compares rotor speed command $\omega_r^*$ with the measured rotor speed $\omega_r$ to determine a speed error, the difference between the two speeds. A flux linkage gauge 219 measures the flux linkage $\lambda_r$ of rotor 110.

A flux linkage gauge 219 measures rotor flux linkage $\lambda_r$. A speed regulator 212 uses the speed error to compute a torque reference value $T_e^*$, where e refers to electromagnetic. Equation (12) may be used to compute torque reference value $T_e^*$. A torque module 214 uses the torque reference value $T_e^*$ and the rotor flux linkage $\lambda_r$ to compute a torque producing harmonic component current of the fundamental frequency, that is, torque harmonic component current $i_{qs1}^*$ Equations (13), (14), and (15) may be used to compute harmonic component current $i_{qs1}^*$ of the fundamental frequency:

$$T_{e1} = \frac{5}{2}\frac{P}{2}\frac{L_{m1}}{L_{r1}}i_{qs1}\lambda_{dr1}; \tag{13}$$

$$T_{e3} = 3\frac{5}{2}\frac{P}{2}\frac{L_{m3}}{L_{r3}}i_{qs1}\lambda_{dr3}; \tag{14}$$

$$T_e = T_{e1} + T_{e3} \tag{15}$$

where P refers to the number of poles. A multiplier 216 multiplies the torque harmonic component current $i_{qs1}^*$ by a constant K to yield another harmonic component current, for example, a third harmonic component current $i_{qs3}^*$. Constant K may be within a range of 0.5 to 0.20, for example, 0.15, such that the amplitude of harmonic component current $i_{qs3}^*$ is 0.15 the amplitude of harmonic component current $i_{qs1}$. The fundamental harmonic component current $i_{qs1}^*$ and the third harmonic component current $i_{qs3}^*$ change in response to the speed error in order to minimize the speed error, resulting in the steady state of motor 102. Harmonic component currents $i_{qs1}^*$ and $i_{qs3}^*$ of the fundamental frequency are sent to transformation module 218.

A flux linkage gauge 219 measures the rotor flux linkage $\lambda_{dr1}$ which is transmitted to a flux module 220. Flux module 220 generates a flux producing harmonic component current of the fundamental frequency, for example, a fundamental harmonic component current $i_{ds1}^*$, from the rotor flux linkage $\lambda_{dr1}$ Equations (16) and (17) may be used to generate the flux harmonic component current $i_{ds1}^*$:

$$\lambda_{dr1} = \lambda_{r1} = L_{m1}i_{ds1} \tag{16}$$

$$\lambda_{dr3} = \lambda_{r3} = L_{m3}i_{ds3} \tag{17}$$

where $$p = \frac{d}{dt}.$$

A multiplier 222 multiplies the fundamental harmonic component current $i_{ds1}^*$ by a constant K' in order to calculate another harmonic component current, for example, a third harmonic component current $i_{ds3}^*$. Constant K' may be within a range of 0.5 to 0.20, for example, 0.15, such that the amplitude of harmonic component current $i_{ds3}^*$ is 0.15 the amplitude of harmonic component current $i_{ds1}^*$. The first harmonic component current $i_{ds1}^*$ and the third harmonic component current $i_{ds3}^*$ of the fundamental frequency are sent to transformation module 218.

A slip speed module 224 computes slip speed so from harmonic component current $i_{qs1}^*$ received from torque module 214 and harmonic component current $i_{ds1}^*$ from flux module 220 using Equations (18) and (19) may be used to compute slip speed $s\omega$:

$$s\omega_{s1} = \frac{r_r i_{qs1}}{L_{r1} i_{ds1}} \tag{18}$$

$$s\omega_{s3} = 3\frac{R_r i_{qs3}}{L_{r3} i_{ds3}} \tag{19}$$

where R refers to resistance.

An adder 226 receives slip speed $s\omega$ from slip speed module 224 and rotor speed $\omega_r$ from speed sensor 108 and computes the stator speed $\omega_s$ from the received speeds. An integrator 228 computes a synchronous angle θ from the stator speed us and transmits synchronous angle θ to transformation module 218.

Transformation module 218 transforms harmonic component currents $i_{qs1}^*$ $i_{q3}^*$, $i_{ds1}^*$ and $i_{ds3}^*$ and an additional harmonic component current $i_n^*$ into command currents $i_a^*$, $i_b^*$, $i_c^*$, $i_d^*$, and $i_e^*$ by transforming the harmonic component currents from a conventional coordinate system defined by the rest frame of motor 102 to a coordinate system defined by the q-axis coordinate system of rotor 110. Harmonic component current $i_n^*$, which represents n-axis current, is assumed to be zero because of the symmetry of motor 102. Transformation module 218 may use Equation (20) to perform the transformation:

$$T(\theta) = \frac{2}{5} \begin{bmatrix} \cos\theta & \cos\left(\theta\frac{2\pi}{5}\right) & \cos\left(\theta - \frac{4\pi}{5}\right) & \cos\left(\theta + \frac{4\pi}{5}\right) & \cos\left(\theta + \frac{2\pi}{5}\right) \\ \sin\theta & \cos\left(\theta\frac{2\pi}{5}\right) & \sin\left(\theta - \frac{4\pi}{5}\right) & \sin\left(\theta + \frac{4\pi}{5}\right) & \sin\left(\theta + \frac{2\pi}{5}\right) \\ \cos 3 & \cos 3\left(\theta\frac{2\pi}{5}\right) & \cos 3\left(\theta - \frac{4\pi}{5}\right) & \cos 3\left(\theta + \frac{4\pi}{5}\right) & \cos 3\left(\theta + \frac{2\pi}{5}\right) \\ \sin 3\theta & \sin 3\left(\theta\frac{2\pi}{5}\right) & \sin 3\left(\theta - \frac{4\pi}{5}\right) & \sin 3\left(\theta + \frac{4\pi}{5}\right) & \sin 3\left(\theta + \frac{2\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \quad (20)$$

Current regulator 106 receives command currents 103a from processor 104 and adjusts command currents 103a in response to current feedback received from motor 102. Adders 230 compare the command currents $i_a{}^*, i_b{}^*, i_c{}^*, i_d{}^*$, and $i_e{}^*$ with measured currents $i_a, i_b, i_c, i_d,$ and $i_e$, respectively, from motor 102 to determine the current error. Hysteresis regulators 232 receive the current error from adders 230 and determine how to minimize the error. For example, if the measured current $i_a$ is greater than the command current $i_a{}^*$, the command current $i_a{}^*$ needs to be decreased. Hysteresis regulators 232 send instructions for minimizing error to switch status module 234. Switch status module 234 receives the instructions and determines how an inverter 236, which is described in more detail in connection with FIG. 3, needs to adjust the command currents before sending the currents to stator windings 126. For example, switch status module 234 determines that command current $i_a{}^*$ needs to be switched in the negative direction to decrease the current.

Thus, processor 104 operates to provide the proper command currents 103 to motor 102. Command currents 103 are generated from multiple harmonic components of a fundamental frequency to induce a substantially rectangular air flux density in motor 102, yielding greater power and torque density. Current regulator 106 operates to adjust command currents 103 to ensure that motor 102 maintains a substantially rectangular air gap flux density.

FIG. 3 is a block diagram of inverter 236 of FIG. 2 according to the teachings of the present invention. A power supply 235 supplies a current to inverter. Inverter 236 receives instructions for minimizing error from switch status module 234. Pairs of transistors 302 operate to adjust the command currents according to the instructions. For example, a pair of transistors 302a receives an instruction to switch command current $i_a{}^*$ in the negative direction to decrease the current. After adjusting the command currents, inverter 236 sends the currents to stator windings 126.

Figure 4:
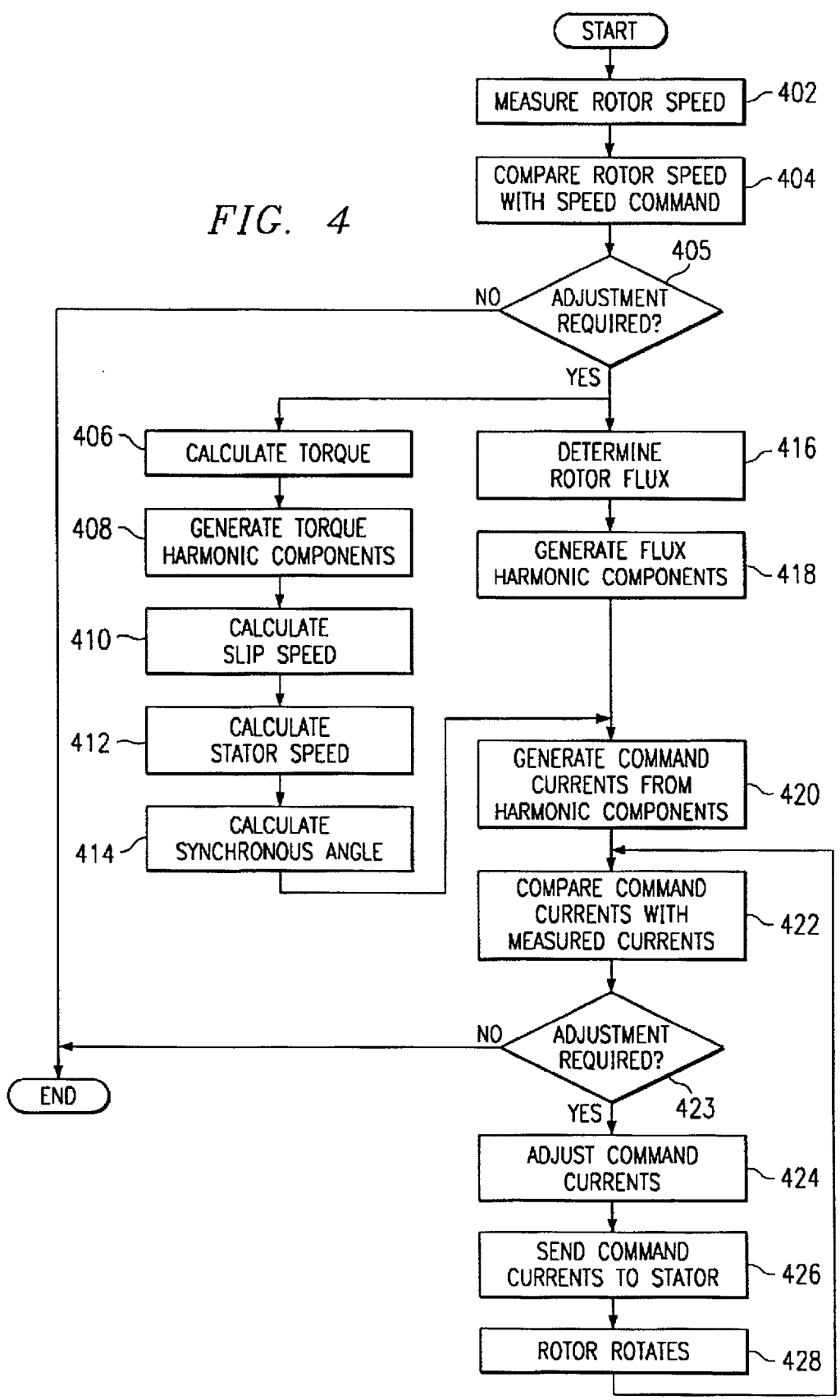
FIG. 4 is a flowchart of one embodiment of method for operating a multi-phase induction motor drive system.

FIG. 4 is a flowchart illustrating a method for operating a multi-phase induction motor drive system, which is described with reference to FIGS. 1 through 3, according to the teachings of the present invention. The method begins at step 402, where the rotor speed $\omega_r$ of motor 102 is measured. Rotor speed $\omega_r$ may be measured by using speed sensor 108. In step 404, the measured rotor speed $\omega_r$ is compared with rotor speed command $\omega_r{}^*$ to calculate a speed error. Adder 210 may be used to compare the measured rotor speed $\omega_r$ with speed command $\omega_r{}^*$. At step 405, the speed error is used to determine whether an adjustment is required. The speed error may be compared with a predetermined acceptable range of error to determine whether an adjustment is required. If an adjustment is not required, the method terminates. If an adjustment is required, the method proceeds to steps 406 and 410.

At step 406, a torque reference value $T_e{}^*$ is calculated from the speed error. Speed regulator 212 may be used to compute the torque reference value $T_e{}^*$. At step 408, torque producing harmonic component currents $i_{qs1}{}^*$ and $i_{qs3}{}^*$ of a fundamental frequency are generated from the torque reference value $T_e{}^*$. The fundamental frequency may be determined from a signal from speed sensor 108 indicating the fundamental frequency of a command current 103b. Torque module 214 may be used to determine harmonic component current $i_{qs1}{}^*$. Multiplier 216 may be used to compute harmonic component current $i_{qs3}{}^*$ from harmonic component current $i_{qs1}$. Harmonic component currents $i_{qs1}{}^*$ and $i_{qs3}{}^*$ are sent to transformation module 218.

At step 410, the slip speed s$\omega$ is determined using torque reference value $T_e{}^*$ and rotor flux linkage $\lambda_{dr1}$. Slip speed module 224 may be used to compute the slip speed s$\omega$. At step 412, stator speed $\omega_s$ is calculated from slip speed s$\omega$ and rotor speed $\omega_r$. Adder 226 may be used to compute stator speed $_{107\ s}$. At step 414, synchronous angle $\theta$ is determined from the stator speed $\omega_s$. Integrator 228 may be used to determine the synchronous angle $\theta$.

At step 416, rotor flux linkage $\lambda_{dr1}$ is measured using, for example, flux linkage gauge 219. At step 418, flux producing harmonic component currents $i_{ds1}{}^*$ and $i_{ds3}{}^*$ of the fundamental frequency are generated from rotor flux linkage $\lambda_{dr1}$ Flux module 220 may be used to generate harmonic component current $i_{ds1}{}^*$. Multiplier 222 may be used to determine harmonic component current $i_{ds3}{}^*$ from harmonic component current $i_{ds1}{}^*$. Harmonic component currents $i_{ds1}{}^*$ and $i_{ds3}{}^*$ are sent to transformation module 218.

As step 420, command currents $i_a{}^*, i_b{}^*, i_c{}^*, i_d{}^*,$ and $i_e{}^*$ are generated from harmonic component currents $i_{qs1}{}^*, i_{qs3}{}^*, i_{ds1}{}^*,$ and $i_{ds3}{}^*$. Transformation module 218 may be used to generate the command currents. At step 422, command currents $i_a{}^*, i_b{}^*, i_c{}^*, i_d{}^*,$ and $i_e{}^*$, are compared with measured currents $i_a, i_b, i_c, i_d,$ and $i_e$. Adders 230 may be used to compare the currents to determine a current error. At step 423, the current error is used to determine whether an adjustment is required. The current error may be compared with a predetermined acceptable range of current error to determine whether an adjustment is required. If an adjustment is not required, the method terminates. If an adjustment is required, the method proceeds to step 424.

At step 424, command currents are adjusted in response to the comparison. Hysteresis regulators 232 may be used to determine how to minimize the current error. Switch status module 234 may be used to determine how inverter 236 needs to adjust the command currents. At step 426, the command currents are sent to stator 112. Inverter 236 may be used to send adjusted command currents to stator 112. At step 428, rotor 110 rotates in response to the command currents in stator 112. The method then proceeds to step 422, where command currents $i_a{}^*, i_b{}^*, i_c{}^*, i_d{}^*,$ and $i_e{}^*$, are compared with measured currents $i_a, i_b, i_c, i_d,$ and $i_e$.

Thus, the method operates to provide the proper command currents 103a to motor 102. Command currents 103 are generated from multiple harmonic components of a fundamental frequency to induce a substantially rectangular air flux density in motor 102, yielding greater power and torque density. Command currents 103 are adjusted to ensure that motor 102 maintains a substantially rectangular air gap flux density.

Embodiments of the invention may provide numerous technical advantages. For example, a technical advantage of one embodiment is that the power density of a motor may be improved by enhancing the motor's ability to utilize rectangular voltage input. Another technical advantage of one embodiment is that a combination of the harmonic components of a fundamental frequency may be used to increase torque density. Another technical advantage of one embodiment is that a multi-phase motor may be able to operate under loss of one or more phases, increasing the reliability of the motor. Another technical advantage of one embodiment is that the flux of the multi-phase motor may be more evenly distributed than that of known motors, decreasing the torque pulsation, which may lower acoustic noise in the motor.

Although an embodiment of the invention and its advantages are described in detail, a person skilled in the art could make various alterations, additions, and omissions without departing from the spirit and scope of the present invention as defined by the appended claims.

What is claimed is:

1. A multi-phase induction motor drive system, the system comprising:
   a motor having at least five phases and comprising a stator and a rotor, the motor, for each phase, operable to receive a command current to power the motor, the command current having a fundamental frequency;
   a processor operable to determine, for each phase, at least one harmonic component of a signal indicative of the fundamental frequency, to generate a command current from the harmonic component and the fundamental frequency using a flux module coupled to the processor, and to supply the command current to the stator, wherein the flux module is operable to determine a flux linkage of the rotor and to generate the fundamental frequency and the harmonic component from the flux linkage.

2. The system of claim 1, wherein the harmonic component has a third harmonic frequency.

3. The system of claim 1, wherein the amplitude of a current having the harmonic component is five to twenty percent of the amplitude of a current having the fundamental frequency.

4. A multi-phase induction motor drive system, the system comprising:
   a motor having at least five phases and comprising a stator and a rotor, the motor, for each phase, operable to receive a command current to power the motor, the command current having a fundamental frequency; and
   a processor operable to determine, for each phase, at least one harmonic component of a signal indicative of the fundamental frequency, to generate a command current from the harmonic component and the fundamental frequency, and to supply the command current to the stator, wherein the processor comprises a transformation module operable to generate the command current by transforming currents having the harmonic component and the fundamental frequency from a coordinate system defined by the rest frame of the motor to a coordinate system defined by the q-axis of the rotor.

5. A method of operating a multi-phase induction motor drive, the method comprising:
   supplying to a motor having at least five phases a first command current to power the motor, the first command current having a fundamental frequency and the motor comprising a stator and a rotor;
   determining, for each phase, at least one harmonic component of a signal indicative of the fundamental frequency;
   generating a second command current from the harmonic component and the fundamental frequency, the fundamental frequency and the harmonic component generated from a flux linkage of the rotor; and
   supplying the second command current to the stator.

6. The method of claim 5, wherein the harmonic component is has a third harmonic frequency.

7. The method of claim 5, wherein the amplitude of a current having the harmonic component is five to twenty percent of the amplitude of a current having the fundamental frequency.

8. A method of operating a multi-phase induction motor drive, the method comprising:
   supplying to a motor having at least five phases a first command current to power the motor, the first command current having a fundamental frequency and the motor comprising a stator and a rotor;
   determining, for each phase, at least one harmonic component of a signal indicative of the fundamental frequency;
   generating a second command current from the harmonic component and the fundamental frequency, wherein the harmonic component and the fundamental frequency is generated by transforming currents having the harmonic component and the fundamental component from a coordinate system defined by the rest frame of the motor to a coordinate system defined by the q-axis of the rotor; and
   supplying the second command current to the stator.

9. A method of operating a multi-phase induction motor drive, the method comprising:
   supplying to a motor having at least five phases a first command current to power the motor, the first command current having a fundamental frequency, the motor comprising a stator and a rotor, the stator comprising a plurality of stator windings having substantially concentrated windings;
   determining, for each phase, a harmonic component of a signal indicative of the fundamental frequency, the harmonic component having a frequency that is a third harmonic frequency of the fundamental frequency by:
   determining an electromagnetic torque of the motor;
   generating the fundamental frequency and the harmonic component from the electromagnetic torque;
   determining a flux linkage of the rotor; and
   generating the fundamental frequency and the harmonic component from the flux linkage;
   generating a second command current from the fundamental frequency and the harmonic component;
   measuring a current from the motor to determine a current error;
   adjusting the second command current according to the current error;
   supplying the second command current to the stator; and
   inducing a flux density in an air gap, the flux density having a substantially rectangular-shape, the air gap substantially between the rotor and the stator.

* * * * *